United States Patent [19]

Abu-Isa et al.

[11] Patent Number: 5,834,535

[45] Date of Patent: Nov. 10, 1998

[54] MOLDABLE INTUMESCENT POLYETHYLENE AND CHLORINATED POLYETHYLENE COMPOSITIONS

[75] Inventors: Ismat Ali Abu-Isa, Rochester Hills; Craig Bryant Jaynes, Bloomfield Hills, both of Mich.

[73] Assignee: General Motors Corporation, Detroit, Mich.

[21] Appl. No.: 780,103

[22] Filed: Dec. 22, 1996

Related U.S. Application Data

[63] Continuation-in-part of Ser. No. 733,089, Oct. 16, 1996, abandoned, which is a continuation of Ser. No. 515,083, Aug. 21, 1995, abandoned.

[51] Int. Cl.⁶ ........................................... C08K 5/02
[52] U.S. Cl. ................. 523/179; 521/106; 521/109.1; 521/116; 524/377; 524/378; 524/415; 524/416; 524/436; 524/437
[58] Field of Search ..................... 524/378, 377, 524/415, 416, 436, 437; 523/179; 521/106, 109.1, 116; 525/104, 106

[56] References Cited

U.S. PATENT DOCUMENTS

| | | | |
|---|---|---|---|
| 3,260,694 | 7/1966 | Wang et al. | 174/110 |
| 3,351,677 | 11/1967 | Barton et al. | 260/889 |
| 3,454,544 | 7/1969 | Young et al. | 260/88.2 |
| 3,562,197 | 2/1971 | Sears et al. | 260/28.5 |
| 3,810,862 | 5/1974 | Mathis et al. | 260/42.45 |
| 3,845,166 | 10/1974 | Betts et al. | 260/897 C |
| 3,872,041 | 3/1975 | Koerber | 260/23 X |
| 3,936,416 | 2/1976 | Brady | 524/387 |
| 3,936,420 | 2/1976 | Gray | 524/416 |
| 3,943,194 | 3/1976 | Dony et al. | 524/416 |
| 4,129,535 | 12/1978 | Elcik | 260/23 X |
| 4,198,493 | 4/1980 | Marciandi | 525/164 |
| 4,472,556 | 9/1984 | Lipowitz et al. | 525/106 |
| 4,503,192 | 3/1985 | McShane et al. | 525/204 |
| 4,689,362 | 8/1987 | Dexter | 524/266 |
| 4,824,906 | 4/1989 | Honsberg et al. | 525/74 |
| 4,871,795 | 10/1989 | Pawar | 524/267 |
| 4,892,683 | 1/1990 | Naseem | 252/609 |
| 5,025,042 | 6/1991 | Yoshida et al. | 524/436 |
| 5,036,121 | 7/1991 | Coaker et al. | 524/100 |
| 5,071,901 | 12/1991 | Chakrabarti et al. | 524/415 |
| 5,286,576 | 2/1994 | Srail et al. | 524/416 |
| 5,356,983 | 10/1994 | Vijayendran et al. | 524/416 |
| 5,412,014 | 5/1995 | Romenesko | 524/416 |

FOREIGN PATENT DOCUMENTS

| | | | |
|---|---|---|---|
| 0111287 A2 | 6/1984 | European Pat. Off. | |
| 0167084 A2 | 1/1986 | European Pat. Off. | |
| 308699 | 3/1989 | European Pat. Off. | 524/416 |
| 2328029 | 5/1977 | France | |
| 0153210 | 12/1981 | Germany | |
| 54-22450 | 2/1979 | Japan | 524/416 |
| 3-41138 | 2/1991 | Japan | 525/104 |
| 1567315 | 5/1980 | United Kingdom | |

OTHER PUBLICATIONS

WPI Database, Derwent Publications Ltd., abstract of JP–A–01 132 685.
WPI Database, Derwent Publications Ltd., abstract of JP–A–53 031 732.

*Primary Examiner*—Veronica P. Hoke
*Attorney, Agent, or Firm*—George A. Grove

[57] ABSTRACT

An intumescent thermoplastic elastomer molding composition is disclosed that includes high density polyethylene with chlorinated polyethylene and/or silicone rubber; a heat stabilizer for the thermoplastic elastomer material and an intumescent and fire-resistant additive for the thermoplastic elastomer, whereby moldings prepared from such mixture have good physical properties over a substantial range of ambient temperatures and display a resistance to flame and heat as characterized by the Intumescence Efficiency test of this specification.

6 Claims, 6 Drawing Sheets

MOLDABLE INTUMESCENT POLYETHYLENE AND CHLORINATED POLYETHYLENE COMPOSITIONS

This is a continuation-in-part of copending U.S. Ser. No. 08/733,089, filed Oct. 16, 1996, which is a continuation of U.S. Ser. No. 08/515,083, filed Aug. 21, 1995.

This invention relates to moldable and intumescent polyethylene and chlorinated polyethylene compositions that have good physical properties and an intumescent efficiency as determined by tests described in the specification such that articles molded from the compositions are useful over a wide range of ambient temperatures and hydrocarbon-containing environments and the like.

BACKGROUND OF THE INVENTION

Intumescent paints have been devised for use on wall surfaces of buildings, ships or other structures or vessels intended for human occupancy and which are susceptible to fires. In addition to their film forming resins, such paints contain ingredients which will react on severe heating to generate gases and form an incombustible or low combustible residue. The expelled gases expand the residue into a thin foam layer with thermal insulating properties. The foam produced from the coating must be tough and adherent so as to resist violent drafts and thermal expansion forces arising from the fire. In many instances, the residue is a carbon char which is formed by the dehydration of a polyhydric substance such as a polyalcohol. The reactions all take place within the coating so when the coating film is heated to beyond a specific elevated temperature, an intumescent additive such as the polyhydric alcohol is decomposed, generating water, carbon dioxide, ammonia and/or other heat absorbing gases that do not readily support combustion.

While intumescent coatings have been available, they are not always easy to apply where needed and they can serve no purpose other than as a coating. It would be desirable to provide moldable thermoplastic compositions having intumescent properties. Such moldable thermoplastic compositions could be shaped into a useful part or article at a suitable manufacturing location and thereafter serve a useful purpose such as a structural member, a shelf or other storage member, or a sound-deadening or other barrier member in addition to providing an intumescent barrier in the event of a fire. Heretofore, such moldable intumescent thermoplastic compositions have not been available. Suitable combinations of moldable polymers, heat stabilizers and intumescent additions have not been found. In particular, moldable compositions possessing the combination of suitable physical properties and intumescence over a range of ambient temperatures such as might be experienced in a ship or an automobile or the like have not been available.

SUMMARY OF THE INVENTION

This invention comprises high density polyethylene (HDPE) and/or chlorinated polyethylene (CPE) molding compositions that provide intumescent properties to moldings formed from them. In a preferred embodiment of the invention, mixtures of HDPE and CPE are used so as to form a thermoplastic elastomer. The proportions of the thermoplastic, HDPE, and elastomer, CPE, are adjusted for the desired properties. In this embodiment, a slitable silicone rubber may be substituted for some or all of the CPE, especially when higher temperature resistance is desired in the molded product.

In other embodiments of the invention, moldable compositions may be formulated using HDPE or CPE alone. When either HDPE or CPE is used alone, it may be preferred to use the sole polymer in a lightly cross-linked form.

Thermoplastic elastomers are a family of materials that have the properties of elastomers but can be processed as plastics. Being elastomeric, they have the desirable properties of flexibility, impact resistance, energy and shock absorption, and sound and vibration reduction. They can be formed by compression molding, injection molding, extrusion, vacuum forming and blow molding. Thermoplastic elastomers are recyclable, and in plant scrap generated during processing can be chopped up and used again to make parts. If such material can be made intumescent, then a convenient form of fire protection is available that can be introduced in vehicles on the assembly line.

The present invention teaches the making of intumescent thermoplastic elastomers or a lightly cross-linked HDPE or CPE that can be easily made into automotive parts and are very effective as a heat and fire barrier. Upon burning, these materials will not melt and drip but will form a relatively strong foamed barrier of char and inorganic ceramic-like material. The intumescent material could be used to replace existing plastic parts in cars or as a cover or shield to protect other plastic parts. In the thermoplastic elastomer embodiment, the material is based on high density polyethylene as the hard phase of thermoplastic elastomer and chlorinated polyethylene and/or silicone rubber as the soft phase. Properties of compression molded, injection molded and foamed parts will be presented.

Moreover, moldings produced from the compositions suitably have at least certain minimal physical properties such as a tensile strength of 2.7 MPa (400 psi) and an elongation at break of at least 50 percent at normal room temperature (ASTM D412). Such properties give moldings sufficient strength and durability so as to be useful in architectural applications, automotive applications, marine applications or the like. In addition to being formable and having useful physical properties for such applications, the moldings also have "intumescence efficiency." When exposed to elevated temperatures, the intumescent additives react or decompose to convert the molded plastic body to a residual insulating foam-like structure that is resistant to burning and insulates the back side of the molding from the high temperatures of the combustion flame.

Suitable constituents of the subject intumescent thermoplastic elastomer molding compositions comprise:

1. Resin Matrix:

In the thermoplastic elastomer embodiment of the invention, a high density polyethylene resin is mixed with a chlorinated polyethylene elastomer and/or a silicone rubber in proportion to obtain desired physical properties in a molded part. A liquid chlorowax (e.g., Paroil 145) is suitably used as a plasticizer when needed to impart flexibility at low temperatures.

When the properties of a thermoplastic elastomer are not required, a HDPE or a CPE may be used alone as the resin matrix. When either HDPE or CPE is to be used as the sole resin, it is preferred that it be lightly cross-linked. A suitable lightly cross-linked HDPE or CPE is formed by employing up to about 5% to 10% of the cross-linker and any cross-linking coagent required for full cross-linking.

2. Thermal and Oxidation Stabilizers:

Although any suitably compatible stabilizer can be used with HDPE and CPE for protection against heat and oxygen, it is found that a system consisting of distearylthiodipropionate (DSTDP) and a butylated reaction product of p-cresol and dicyclopentadiene (Wingstay L) is very effective as an antioxidant. In addition to such antioxidant, MgO is used in the formulation to absorb evolved HCL produced during aging of chlorinated polyethylene and thus act as an effective dehydrochlorination stabilizer.

3. Gas-Generating Foaming Agents:

These agents are used in the subject compositions to generate gases in order to foam the polymeric matrix before it is consumed by the fire. The residue that remains after burning of most organic material will have a porous char structure and will thus be an effective thermal barrier. Two preferred gas-generating agents used in this invention are ammonium dihydrogen phosphate, $NH_4H_2PO_4$, and ammonium polyphosphate, approx. $(NH_4PO_3)_n$, which emit ammonia when heated. Hydrated alumina and hydrated magnesia are also preferred because they emit water vapor when heated. The ammonium dihydrogen phosphate will also form phosphoric acid which will act as a catalyst to encourage char formation from polyhydroxy compounds.

4. Char Formers:

Any suitable compatible starch or other carbohydrate may be used in the moldable compositions to form heavy char when exposed to fire. Polyhydric alcohols also perform the same function. A preferred char former is monopentaerythritol or dipentaerythritol.

5. In appropriate formulations, other ingredients are beneficially added to intumescent moldable material. The first is a filler consisting of glass fibers, mica particles and/or titanium oxide powder. These fillers help strengthen the molding and develop a strong structure of the material after intumescing. The second ingredient is antimony oxide which imparts fire retardancy to the intumescent material and hence slows down the burning process. This is helpful in decreasing heat release rate during fire and increasing the char content.

Further objects and advantages of the invention will be more apparent from a detailed description thereof which follows. Reference will be had to the drawings.

DESCRIPTION OF PREFERRED EMBODIMENTS

This invention provides intumescent thermoplastic molding compositions that can be blow molded, injection molded, compression molded or otherwise suitably molded and shaped to a desired geometry or configuration by thermal processes. In some applications, the molded part may be intended to serve primarily as a heat or fire barrier. More often, it will also serve another functional purpose and serve incidentally as a heat or fire barrier. In either case, the invention provides a moldable material mixture that can be formed into a molded product in a suitable manufacturing facility and transported for efficient handling at an automobile assembly line or at a construction site or the like. Thus, the subject composition facilitates efficient manufacture and assembly and provides robust physical and fire-resistant properties in use.

The values in Table 1 opposite each ingredient are parts by weight, and the numbers for each moldable composition mixture total 100. Table 1 illustrates a specific moldable intumescent composition in which a suitable high density polyethylene and a suitable chlorinated polyethylene are used together to form a thermoplastic elastomer-based composition. The "range" column also discloses a family of suitable compositions in which the HDPE and CPE are used in combination or alone. Thus, at least one of HDPE or CPE is to be present in an amount sufficient to form a suitable moldable composition and molded product. In further illustrated embodiments of the invention below, it will be shown that a suitable silicone rubber may be substituted for some or all of CPE when mixed with an HDPE.

TABLE 1

Intumescent Material Formulations

| Ingredient | A Preferred Concentration (% by weight) | Suitable Range (% by weight) |
| --- | --- | --- |
| High Density Polyethylene (Paxon 4261A) | 23 | 0–60 |
| Chlorinated Polyethylene (Dow Chemical 3615P) | 30 | 0–60 |
| Chlorowax (Dover Chemical, Paroil 145) | 7 | 0–15 |
| Ammonium Dihydrogen Phosphate (Monsanto Phoscheck P/30) | 8 | 5–15 |
| Hydrated Magnesium Oxide (Lonza Inc., Magnifin H7) | 2 | 0–10 |
| Hydrated Aluminum Oxide (Lonza Inc., Martinal OL-104C) | 15 | 5–25 |
| Distearylthiodipropionate (Argus/Witco DSTDP antioxidant) | 0.5 | 0.5–5 |
| Hindered Phenol (R.T. Vanderbilt Wingstay L antioxidant) | 0.5 | 0.5–5 |
| Chopped Glass Fiber (3 to 5 mm length) (PPG) | 6 | 0–20 |
| Antimony Oxide (Harwick Chemical Fireshield H) | 3 | 0–5 |
| Pentaerythritol, Mono & Di (Perstorp) | 5 | 3–10 |

The polyethylene constituent of the subject compositions has a density in the range of 0.940 to 0.970 g/cm$^3$. Such materials are produced using suitable known catalysts at a relatively low pressure of ethylene. Such high density polyethylenes are available with molecular weight ranging from about 10,000 (usually waxes) to ultra high molecular weight HDPE (UHMW—HDPE) of several millions. Wide variation of branching and density are also available.

Many grades of high density polyethylene (HDPE) can be used in this invention depending on the application and the method of processing. High molecular weight/high melt viscosity grades are used for blow molding applications. Low melt viscosity grades are preferred for injection molding. Extrusion is normally performed using intermediate melt viscosities. High density polyethylene by itself could be formulated into an intumescent material; however, it will have relatively poor mechanical properties and vibration and noise isolation properties and will be difficult to process by blow molding.

Chlorinated polyethylene (CPE), suitably with about 36 to 42% by weight chlorine, is preferably combined with HDPE in accordance with the invention at different ratios to produce moldable intumescent thermoplastic elastomer grades with varying degrees of hardness. CPE can also be formulated into an intumescent material without HDPE but only through the addition of a small concentration of cross linking agents. The intumescent composition formed will be highly elastomeric and will act as an efficient noise and vibration isolator, especially if the material is foamed during processing.

When mixed with HDPE, chlorinated polyethylene can be substituted in part or totally with silicone rubber. The advantages of using silicone will be that during burning, less smoke is evolved. Also, if silicone rubber was used to substitute all of the CPE, no chlorinated gaseous products will be found in the burning products of the intumescent material.

Chlorowax is used when a plasticizer is desired or required. Its presence in the formulation will improve low temperature properties of the intumescent CPE/HDPE thermoplastic elastomer mixture. An added advantage of chlorowax is that it contributes to the char formation during burning of the intumescent material.

The presence of ammonium dihydrogen phosphate (or ammonium polyphosphate) promotes char formation, leads to a strong structure of the intumescent material structure after burning, and helps in the intumescence process by emitting ammonia gas during burning.

Both hydrated alumina and hydrated magnesia emit water vapor during burning, and they act to induce intumescence and cool down the fire. In addition, magnesium oxide acts as a dehydrochlorination stabilizer.

Pentaerythritol as monomolecular and/or bimolecular forms is a very effective char former.

Both the thio-based (DSTDP) and the hindered phenol (Wingstay L) antioxidants are effective in stabilizing the intumescent material against thermal oxidation, especially if used together as co-synergists.

Glass fiber reinforcing filler leads to increased strength in the structure of the intumescent material after burning. Its presence at 3% or higher in the formulation is needed in some formulations to prevent the intumesced residue from being friable. Other fillers that can also provide strength to the residue are titanium dioxide and mica.

The presence of antimony oxide is quite optional. This compound provides added flame retardancy to the formulation. Zinc borate can also be used to impart a similar effect.

Mixing of the Compositions

The mixing of compositions described herein on a laboratory scale was achieved by different methods including mixing on a two-roll mill heated to 65° C. The polymeric resin or resins and the stabilizers were added to the rolls and shear mixed for about five minutes. At that time good mixing was visually observed and the material was banded on one of the rolls. The actual temperature of the resin during mixing approached 150° C. due to shearing of the mixture. The ingredients for intumescence were added next. They were added in a fine powder form and mixed well with the resin. The glass fibers were then added and mixed into the formulation for about three minutes. The total mixing time of each compound was about 15 minutes.

In alternative practices, formulations were also prepared by mixing in a Brabender bowl, which is a small internal mixer, and in a large Banbury internal mixer. In these practices, for example, the Banbury cavity is preheated to 93° C. Then, a first batch of ingredients is added to the bowl. These ingredients include (for example) chlorinated polyethylene and high density polyethylene, hydrated magnesium oxide, hydrated alumina, DSTDP, antimony oxide, corn starch and chlorowax. The mixing speed of the bowl was then increased to 120 rpm, and the ingredients were allowed to mix for two to three minutes. In this example utilizing HDPE, the temperature of the mix was permitted to rise above about 120° C. to melt the polyethylene and incorporate it into the mixture but not permitted to rise above 140° C. to ensure that the products did not undergo degradation. Following this first mixing operation, a second batch of ingredients which include, for example, ammonium dihydrogen phosphate and glass were added to the bowl, mixing was continued for three more minutes or until the temperature reached about 160° C., whichever first occurred. The mix was then removed from the bowl and dumped onto a mill to further mix and sheet out the composition. The temperature of the, mill in the case of this example was about 132° C.

Another example of resin composition mixing that is suitable with the subject moldable compositions involves a Brabender extruder. The effect of temperature and shear rate has been investigated with this extruding device. The temperatures of the three extruder barrel zones and the die were all varied between 150° C. and 175° C. Three settings of the screw speeds were investigated, namely 50, 75 and 100 rpm. The length-to-diameter ratio of the screw was 20 to 1, and the compression ratio was 1. The material extruded well and exhibited good mixing at all of the above conditions. Large scale batches were prepared using a twin screw Buss kneader.

In addition, mixing of the material was conducted on plant scale using a 3.5 inch diameter Buss Kneader having an L/D ratio of 11. The set temperatures of the different zones of the extruder ranged between 138° C. at the feed throat to 158° C. at the die. The feed rate was 300 lbs./Hr. Ten rods 4 mm each in diameter were extruded and palletized at the die face. We prepared 8000 lb. of the blend.

Processing of the Composition

Molding of the composition has been accomplished by compression molding, injection molding and vacuum forming and blow molding. Using compression molding, square slabs (152 mm by 152 mm) of the composition were prepared using a hot press set at a temperature of 150° C. The slabs were molded in various thicknesses varying between 0.2 mm and 2.75 mm.

Standard tensile bars with 50 mm gauge length and 6.35 mm wide and 3.3 mm thick were injection molded. In addition, flex bars (152 mm by 25.4 mm by 3.3 mm), heat deflection bars (152 mm by 12.7 mm by 12.7 mm) and disks (101.6 mm in diameter and 3.3 mm thick) were injection molded. The best samples were obtained for a mold cycle of 45 to 60 seconds when the barrel temperature was controlled at 191° C., the nozzle temperature at 204° C., and the mold temperature at 93° C. Small trays were also injection molded using the intumescent composition. It was found that a ventilated screw is needed for best surface appearance.

Figure 1:
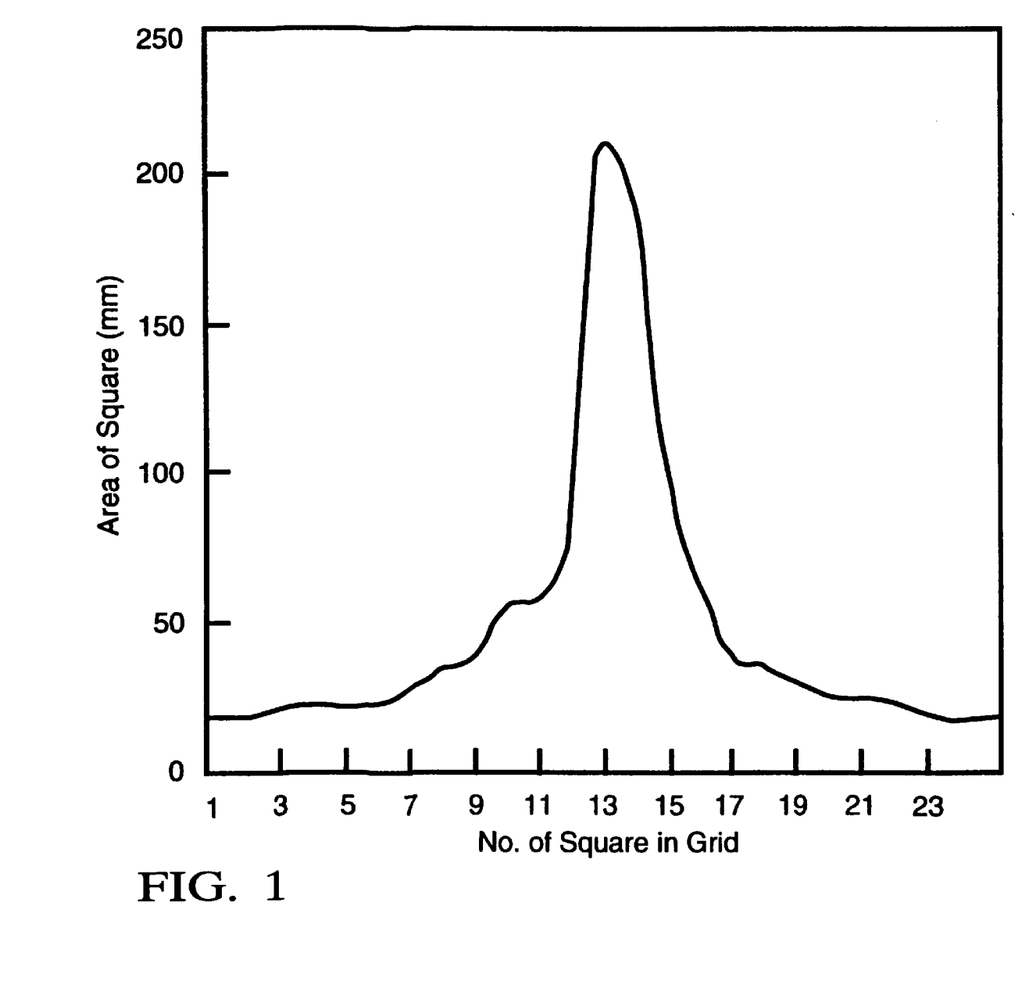
FIG. 1 is a graph of the draw ratio profile from rim to apex of a compression-molded slab of Table 1 composition vacuum-formed into a cone. A grid of 4 mm squares was coated on the slab before forming and the draw ratio depicted by the increased area of the respectively numbered squares in the formed specimen.

Vacuum molding of the Table 1 specific composition intumescent material was carried out in the laboratory. Compression molded slabs (152×152×3.3 mm) were heated for five minutes in an oven set at 145° C. to 150° C. A grid of squares, 4 mm on each side, was printed on a surface of the slabs to accommodate measurement of local elongation of all regions of the slabs in a complex forming or molding operation. They were then vacuum formed in a cone-shaped mold using a vacuum of applied slowly (a period of two seconds). Draw ratios of up to 400% in single dimension or 1406% in area were achieved. The draw ratio profile from the rim to the apex of the cone is shown in FIG. 1 by measurement of the increase in area of each 4 mm×4 mm square in a row of 24 grid squares across a formed slab. The cone-shaped figure of the product is apparent from the plot. Also apparent is the excellent moldability of the Table 1 specific composition. Vacuum forming is a very useful technique for making commercial articles from the subject intumescent material.

Intumescent Test Apparatus

The main function of the intumescent material is in resisting the spread of flame from a fire source and shielding articles protected by the intumescent materials from high temperature rise. The characteristics or property of intumescence efficiency is measured by a procedure using an apparatus described below.

All of the moldable compositions illustrated in this specification have been tested as intumescent compositions to be used for resisting the spread of a flame from a fire source and curtailing temperature rise. The characteristic or property of Intumescence Efficiency as ascribed to moldings from the subject compositions were determined in an apparatus and by a practice as follows. When reference is made to such property in this specification or claims, it is intended that the property be determined utilizing such an apparatus or the equivalent and such practices.

Figure 2A:
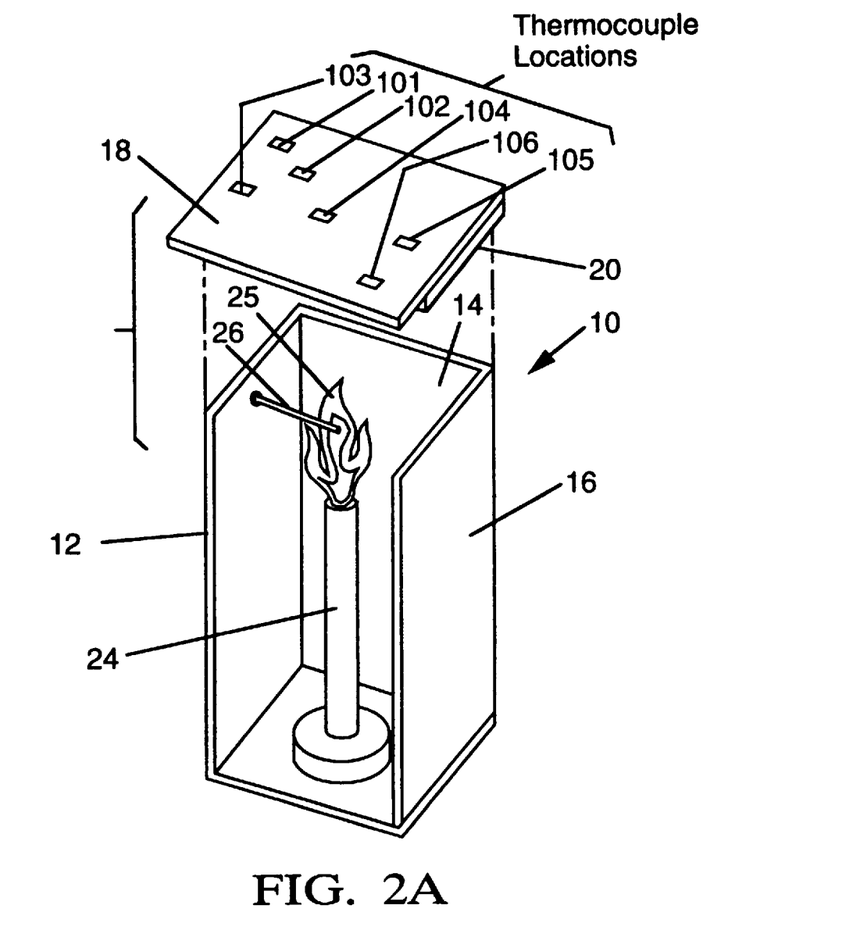
FIG. 2A is a perspective view of apparatus for measuring the efficiency of intumescent moldable compositions in accordance with this invention.

The Intumescence Efficiency test apparatus is shown in FIG. 2A. Apparatus 10 included a three-wall steel chamber comprising left side wall 12, back wall 14 and right side wall 16. Each wall was a steel plate 229 mm high, 127 mm wide and 1 mm thick. The plates were joined at their edges as shown in FIG. 1 to form a generally square-shaped (in cross section) chamber with an open front.

A 152 mm by 152 mm by 1 mm thick steel plate adapted to be placed on top of walls 12, 14 and 16 was employed as a roof member 18. During a test, the roof member 18 carried affixed to its lower surface a molded 127 mm×152 mm×2.75 mm rectangular molded slab 20 of material to be tested for Intumescence Efficiency. Note that the thickness of 2.75 mm of the test specimen (as well as its composition) is important to the repeatability of this test. As shown, the intumescent slab 20 faces downward inside of the roof 18 and chamber during the test. On the top surface 22 of the steel roof panel 18 were located six thermocouple leads in the locations indicated, respectively 101, 102, 103, 104, 105 and 106.

A 165 mm tall Bunsen burner 24 was used as the flame source. The height of the burner did not include the flame height. The flame height was of the order of 60 mm, and it was adjusted during each test so that the tip of the inner blue cone of the flame 25, its hottest part, touched the surface of the intumescent material. A thermocouple indicated at 26 was placed at the lower surface of the intumescent coating 20 to measure the flame temperature as it impinged on the intumescent material at that point. The flame temperature as measured by thermocouple 26 was at a location on the intumescent material opposite the location of thermocouple 104 on the top surface 22 of the steel roof member 18.

While six thermocouple locations as indicated in FIG. 2A were initially used in testing of intumescence efficiency, experience has shown that equivalent useful data is obtained from using only four thermocouples at locations 101, 102, 104 and 106.

Significant Properties of the Intumescent Material

Figure 2B:
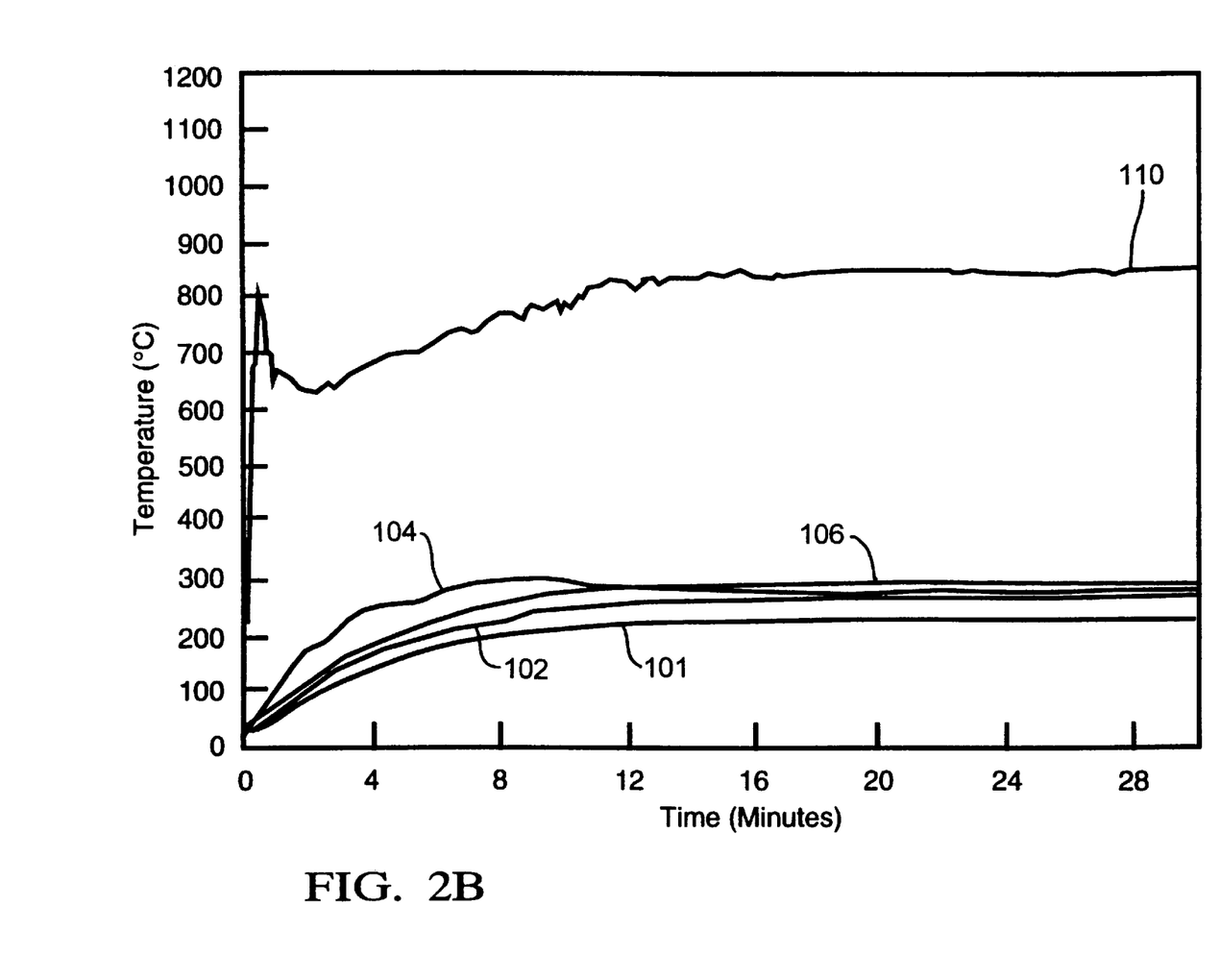
FIG. 2B is a graph depicting temperature versus time at different locations of a steel plate protected by a molded intumescent composition in accordance with the invention.

A molded slab of the specific Table 1 formulation was exposed to the flame of the Bunsen burner in the test apparatus 10. FIG. 2B is a graph of temperature (in degrees Celsius) versus time (in minutes) of the thermocouple measured temperatures at locations 101, 102, 104 and 106 on the top surface 22 of steel plate 24 protected by intumescent material 20 of formulation 1. The curve for the flame temperature in FIG. 2B is designated 110. The curves for the other thermocouple readings in FIG. 2B are designated with the number of their thermocouple location.

FIG. 2B is a graph of temperature (in degrees Celsius) versus time (minutes) of exposure to the Bunsen burner flame of the thermocouple measured temperatures at four locations on the top surface of a steel plate protected by the intumescent material. The flame temperature of the Bunsen burner is set at over 1000° C. The highest temperature measured by the thermocouple in direct contact of the flame reaches a maximum temperature of 853° C. The reading does not reach the expected temperature because of the cooling effect of the gases from the intumescent material and because when the sample intumesces and swells, it comes in contact with the flame thermocouple and also cools it. As seen in FIG. 2B, the maximum temperature reached on the top surface of the steel plate is 299° C., which indicates that the intumescent material was very effective in decreasing the heat flow to the steel plate. Thus, the Intumescence Efficiency of this molded slab is determined to be 299° C. Similar results on the efficiency of injection molded samples as intumescent materials were obtained.

Mechanical Properties

The tensile properties of compression molded and injection molded samples of intumescent material were obtained using ASTM D638 procedures. The tear properties of the samples were obtained using procedures outlined in ASTM D624. The flexural properties were determined per ASTM D790 procedures. The test results are shown in Table 2.

TABLE 2

| | Mechanical Properties Of Compression And Injection Molded Intumescent Composition | | | |
|---|---|---|---|---|
| | Compression Molded | | Injection Molded | |
| Property | Machine Direction | Croos-Machine Direction | Machine Direction | Cross-Machine Direction |
| Tensile Strength (MPa) | 7.3 | 6.4 | 18.4 | 11.0 |
| Elongation (%) | 653 | 550 | 16.6 | 481 |
| Tear Strength (kN/m) | 61 | 56 | 60 | — |

Figure 3:
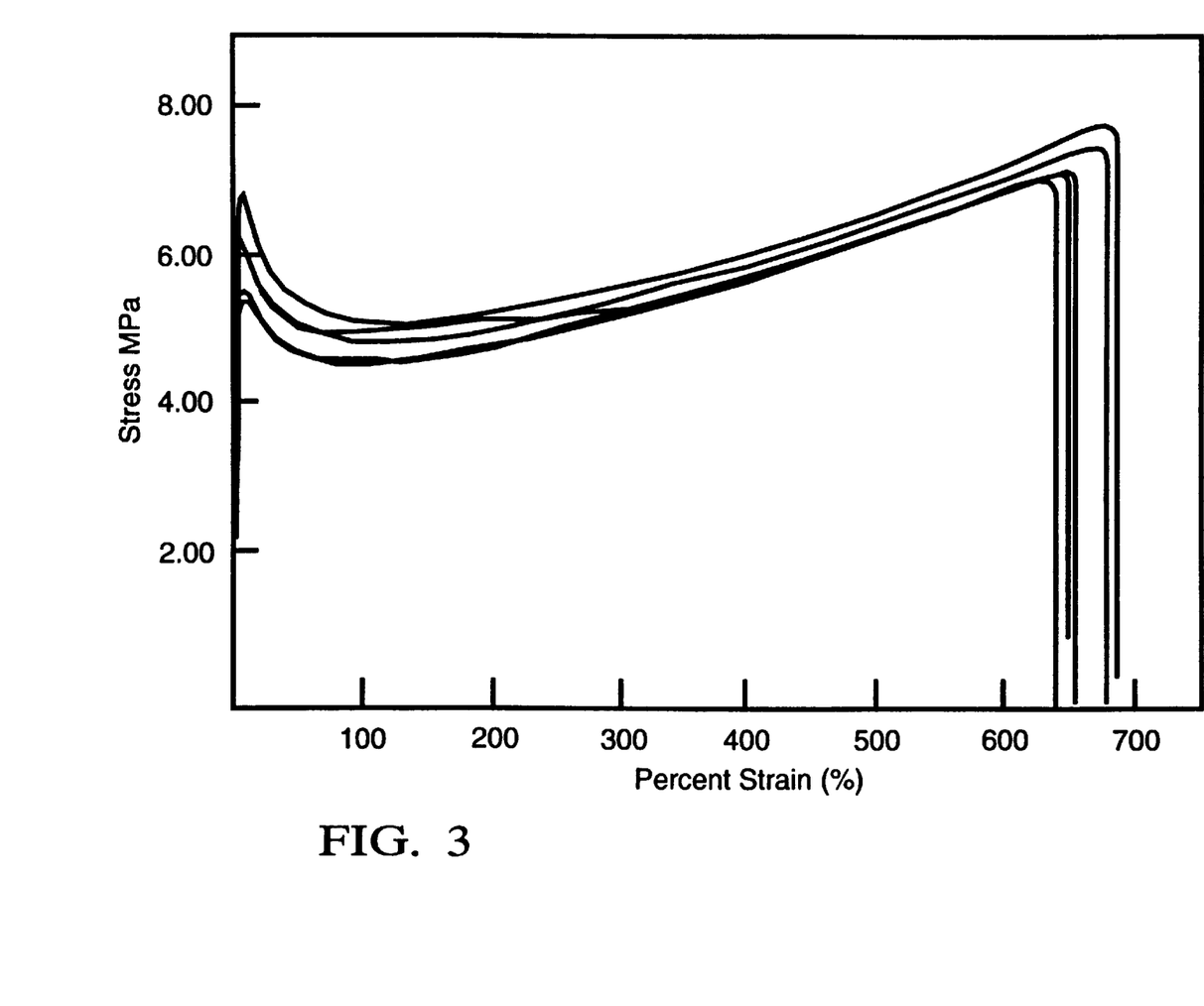
FIG. 3 is a graph of stress versus strain of five compression molded samples the Table 1 formulation of this invention.

FIG. 3 also illustrates specific stress/strain curves for five compression molded samples elongated in the machine direction. The data for these samples is averaged in Table 2.

The properties of the injection molded and compression molded samples are quite, different, reflecting the orientation of glass fiber in the machine direction. Thus, although the tensile strength, elongation and tear strength of the compression molded sample are similar in the machine and cross machine directions, these properties are quite different for the injection molded sample. Tensile strength is increased from 7.3 MPa for the compression molded sample to 18.4 MPa for the injection molded sample when measured in the machine or melt flow direction. The properties in the cross machine direction are closer to each other for the injection and compression molded samples.

The flexural properties of the injection molded sample were also determined. The flexural strength at yield was found to be 14.5 MPa, and the strain at yield 5.5%. The notched Izod impact strength of the sample was also measured per ASTM D 256 procedures and found to be 284 J/m.

Thermal Properties

Figure 4:
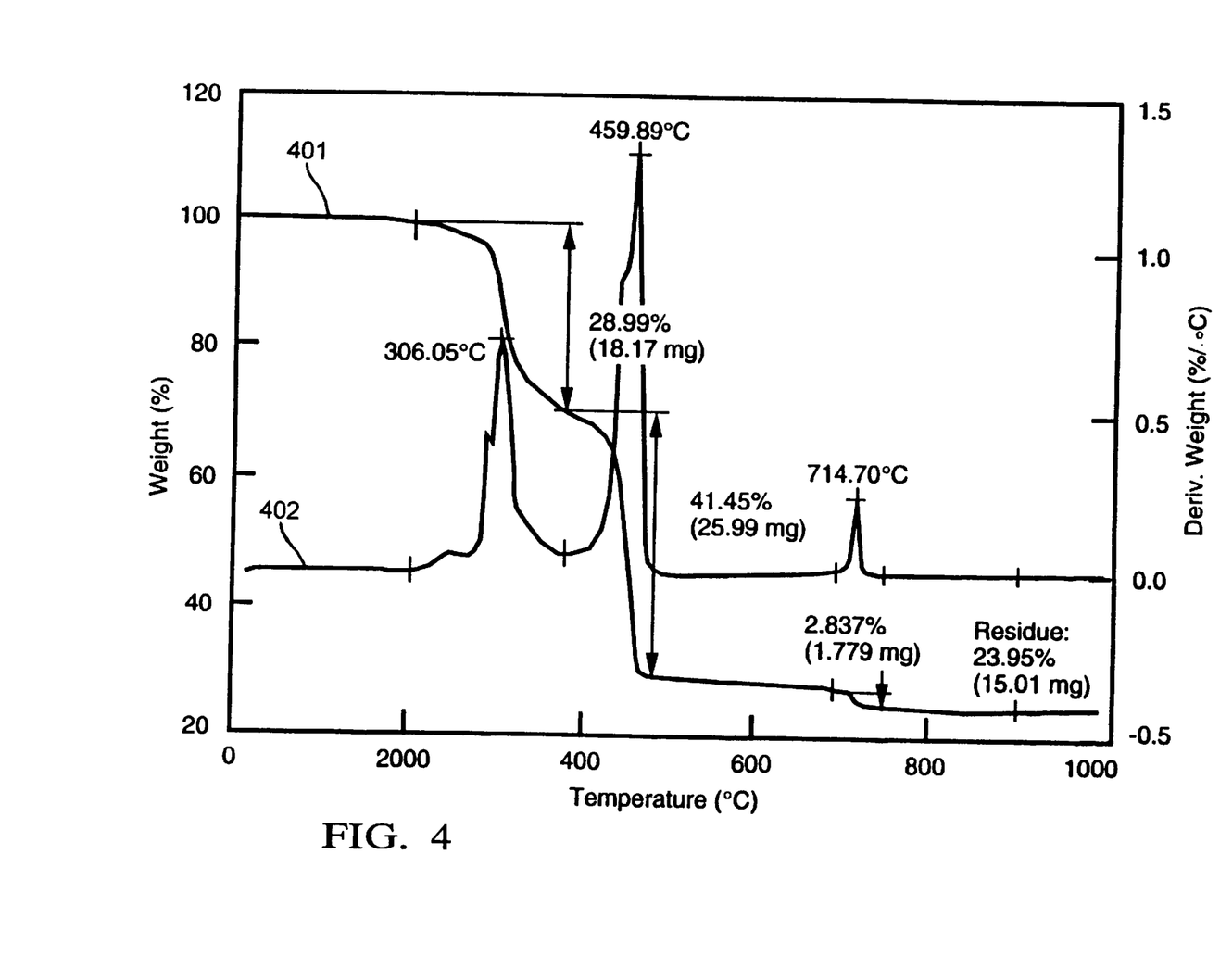
FIG. 4 is a graph depicting a thermogravimetric analysis (TGA) of the Table 1 intumescent molded material.
Figure 5:
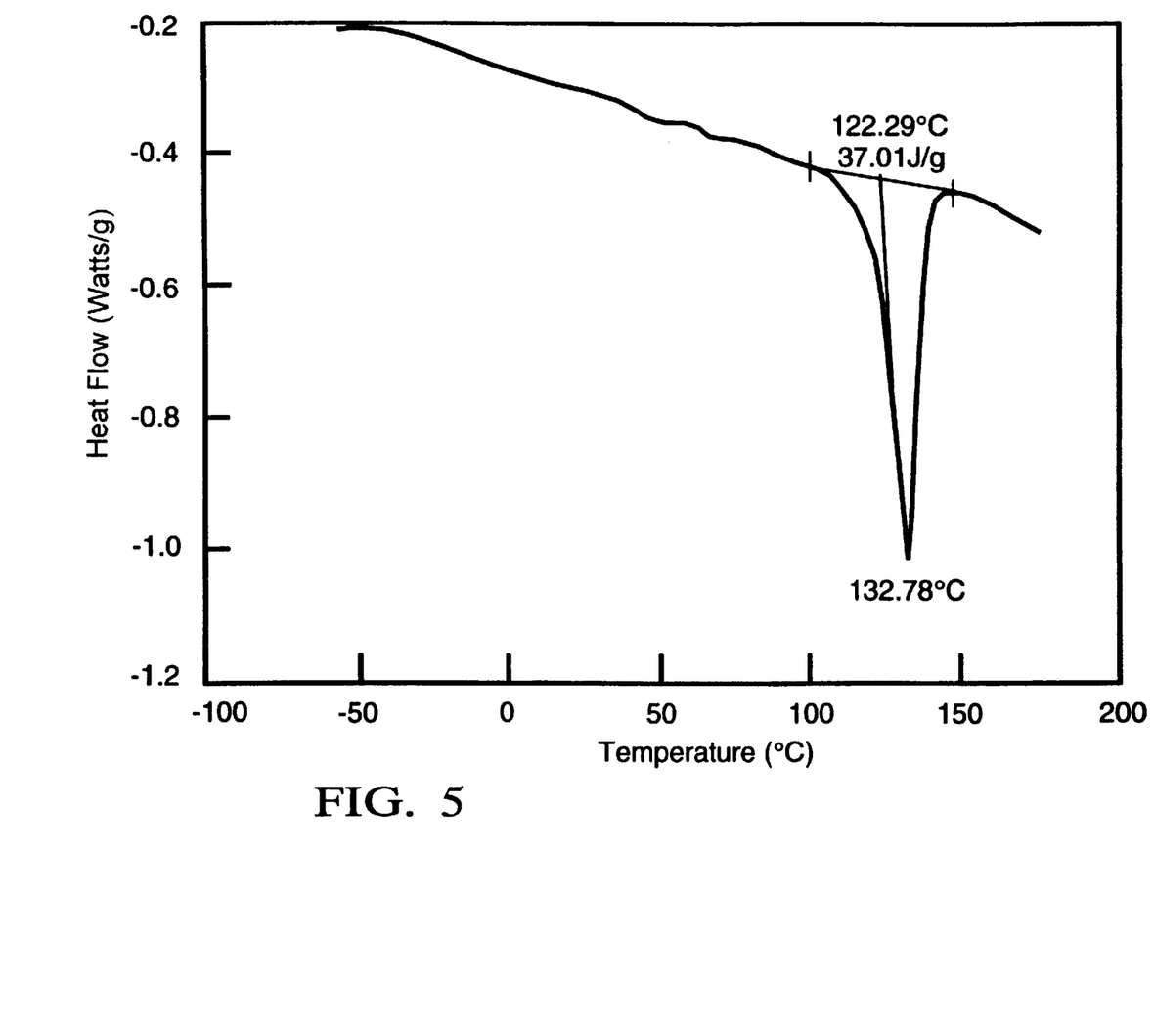
FIG. 5 is a differential scanning calorimetry (DSC) curve of heat flow versus temperature for the Table 1 composition.

Thermal gravimetric analysis (TGA), differential scanning calorimetry (DSC), and thermal conductivity measurements were conducted on the specific composition molded intumescent material of Table 1. TGA behavior is shown in FIG. 4 in a curve (401) that shows weight loss with temperature rise and another curve (402) showing the derivative of weight loss with respect to temperature. No decomposition is observed up to a temperature of 200° C. Three large decomposition peaks are observed at 306° C., 460° C., and 715° C. As seen in FIG. 4, each of these peaks represents weight loss from more than one ingredient as indicated by the shoulders observed on the derivative plot. Inorganic and organic ingredients contribute to the weight loss all through the temperature range. However the major weight loss contributions are assigned to chlorinated polyethylene decomposition at 306° C., high density polyethylene composition at 460° C., and ammonium dihydrogen phosphate and organic char at 715° C. Differential scanning calorimetry (DSC) curve of heat flow versus temperature for the intumescent composition is shown in FIG. 5. The temperature range investigated was −55° C. to 175° C. In these regions, a weak glass transition temperature is observed at −18° C. assigned to the chlorinated polyethylene matrix present in the composite, and a pronounced melting point at 133° C. assigned to HDPE. At higher temperatures, melting peaks of the other ingredients can be observed.

The thermal conductivity of the intumescent material was measured at three temperatures and found to be 0.425 watts per meter per degree Kelvin at 58° C., 0.411 W/m-K at 77° C., and 0.349 W/m-K at 97° C. Corresponding values for HDPE were measured at 0.273, 0.267 and 0.259 W/m-K, respectively. The measurements show that the addition of fillers and intumescent materials did not degrade the thermal insulation characteristics of the HDPE to any significant degree.

Solvent Resistance

The results of the effects of exposure of the molded Table 1-specific composition intumescent material to different automotive fluids on the degree of swell and tear strength of compression molded specimen are shown in Table 3. Samples were immersed in the fluids for four hours at 25° C. After the exposure, the degree of swell was less than 1% in water, salt water, engine coolant, hydraulic brake fluid, windshield washer and automatic transmission fluid. The sample swelled 1.3% in diesel fuel. The tear strength of the sample before fluid exposure was 55 kN/m and as seen from Table 3, the tear strength was maintained at about this value after exposure to the fluids. The chemical resistance of the intumescent material is outstanding.

TABLE 3

Automotive Fluid Resistance of the Intumescent Material

| Fluid | % Swell (by weight) | Tear Strength (kN/m) |
|---|---|---|
| None | — | 55.0 |
| Water | 0.1 | 54.7 |
| Salt Water (5%) | 0.1 | 56.7 |
| Engine Coolant 50/50 (v/v) water/glycol | 0.1 | 54.9 |
| Premium Diesel Fuel | 1.3 | 52.4 |
| Hydraulic Brake Fluid (GM 9985013) | 0.3 | 54.9 |
| Windshield Washer Solution (GM 9985129) | 0.1 | 57.7 |
| Automatic Transmission | 0.2 | 56.1 |

Oven Aging of Intumescent Material

Oven aging of the molded Table 1-specific composition intumescent material was conducted at 120° C. for periods of times extending between 24 hours and 1008 hours as seen in Table 4. The effects of aging time on tensile strength, elongation, and tear strength were evaluated. In all cases no indication of degradation was observed even after 1008 hours of aging 120° C.

TABLE 4

Aging Data at 120° C. for Injection Molded Intumescent Material

| Aging Time (Hr) | Tensile Strength (MPa) | Elongation (%) | Tear Strength (N/mm) |
|---|---|---|---|
| 0 | 18.4 | 16.6 | 60 |
| 24 | 20.6 | 21.7 | 68 |
| 72 | 21.7 | 22.0 | 74 |
| 168 | 22.0 | 23.6 | 72 |
| 336 | 23.8 | 22.6 | 75 |
| 504 | 23.2 | 21.6 | 75 |
| 804 | 22.6 | 22.9 | 74 |
| 1008 | 23.1 | 22.9 | 72 |

Summarized in Table 5 below is a composition in which high density polyethylene (HXM50100, extrusion grade), a trademark of Phillips 66 Plastics, was included. The other constituents of the formulation are listed in Table 5 with the composition values in terms of parts or percentage by weight. Also included in Table 5 is the Intumescence Efficiency value measured on the molded slab of the composition and other relevant physical properties the molded material. The high density polyethylene (HDPE), HXM 50100, is an example of an extrusion grade HDPE suitable for use in this invention. Phillips HMN 4550 is an example of a suitable injection molding grade HDPE for use in this invention.

TABLE 5

| Formulations | % by weight |
|---|---|
| Chlorinated Polyethylene, CPE (Tyrin 4211P) | 33 |
| High Density Polyethylene (HXM50100) | 15.5 |
| Chlorowax (Paroil 145) | 8 |
| Ammonium Dihydrogen Phosphate | 16 |
| Antimony Trioxide | 4 |
| DSTDP Antioxidant | 0.5 |
| Hydrated Magnesium Oxide | 4 |
| Hydrated Aluminum Oxide | 5 |
| 3/16" Glass | 8 |
| Corn Starch | 3 |
| Melamine | 3 |

TABLE 5-continued

| Properties | % by weight |
|---|---|
| Intumescence Efficiency (Highest Temperature °C.) | 314 |
| Glass Transition (Tg °C.) | 11 |
| Tensile Strength (MPa) | 7.4 |
| Elongation at Break (%) | 474 |
| Tear Strength (kN/m) | 45 |

It is seen that the Table 5 composition displayed a good Intumescence Efficiency of 314° C. This composition based on about two parts of CPE per part of HDPE demonstrated good low temperature behavior as well as high ultimate elongation.

Other Formulations

Polymer Substitution

The high density polyethylene and/or the chlorinated polyethylene in the intumescent material formulation were substituted with other polymers as shown in Table 6. Substituting polyethylene and chlorinated polyethylene with ethylene polyvinyl acetate copolymers (Table 6, formulations 1 and 2) resulted in reducing the required torque during melt mixing, thus improving processability, but when the sample was burned using the test apparatus, the flame of the Bunsen burner broke through the sample after only three minutes of heating. Thus, these formulations are not acceptable as intumescent materials. Adding peroxide and TMPT to cross link the matrix resulted in a sample that did not burn through but it softened appreciably, leading one to think that it will not perform well in applications.

TABLE 6

Polymer Substitution

| Ingredient | Preferred Formulation | Polymer Substitution | | | |
|---|---|---|---|---|---|
| | | 1 | 2 | 3 | 4 |
| High Density Polyethylene (Paxon 4261A) | 23 | — | — | — | — |
| Chlorinated Polyethylene (Dow Chemical 3615P) | 30 | — | — | — | 30 |
| Chlorowax (Dover Chemical, Paroil 145) | 7 | — | — | — | 7 |
| Ammonium Dihydrogen Phosphate (Monsanto Phoscheck P/30) | 8 | 10 | 10 | 10 | 8 |
| Hydrated Magnesium Oxide (Lonza Inc., Magnifin H7) | 2 | 2 | 2 | — | 2 |
| Hydrated Aluminum Oxide (Lonza Inc., Martinal OL-104C) | 15 | 20 | 20 | 20 | 15 |
| Distearylthiodipropionate (Argus/Witco DSTDP antioxidant) | 0.5 | 1 | 1 | 1 | 1 |
| Hindered Phenol (R.T. Vanderbilt Wingstay L antioxidant) | 0.5 | — | — | — | — |
| Chopped Glass Fiber (3 to 5 mm length) (PPG) | 6 | 8 | 8 | 8 | 6 |
| Antimony Oxide (Harwick Chemical Fireshield H) | 3 | — | — | — | 3 |
| Pentaerythritol, Mono & Di (Perstorp) | 5 | 7 | 7 | 7 | 5 |
| Ethylene Vinyl Acetate (EXXON LD 612.35) | | 52 | — | 53 | |
| Ethylene Vinyl Acetate (EXXON LD 723.62) | | | 52 | | |
| Dicumyl Peroxide (Di-Cup 40 KE, Hercules) | | | | 0.5 | |
| Trimethylopropane Trimethacrylate (Sartomer, Saret 500) | | | | 0.5 | |
| Polymethyl Methacrylate (Rohm & Haas) | | | | | 23 |
| Properties: | | | | | |
| Torque During Melt Mixing (meter-gram) | 7208 | 2570 | 5294 | 7891 | 5941 |
| High Temperature During Burning (C) | 336 | melted | melted | 347 | 296 |
| Degree of Intumescence (thickness expansion %) | 93 | — | — | 84 | 37 |

Substituting polymethyl methacrylate for high density polyethylene as shown in formulation 4, Table 6, resulted in a low degree of dimensional swell, and the sample was weak and broke up to pieces after the burning run. It did provide, however, good temperature shielding during the burning experiment.

Changing the Polyol

In two formulations, trimethylol propane was substituted for part or all the pentaerythritol. The substitution resulted in lowering the melt viscosity 7208 meter-gram for the preferred formulation to 2039 meter-gram when all the pentaerythritol was replaced by the trimethylol propane, and to 3110 meter gram when three out of the five parts were substituted. Both formulations provided excellent protection, resulting in a maximum temperature of 269° C. and 310° C.

Formulating with Silicone Polymers

Silicone polymers are elastomeric in nature and can be used to replace the chlorinated polyethylene in mixtures with HDPE in the intumescent formulation. Silicone rubber improves the processability by reducing torque, and leads to burning products with lower smoke evolution. Examples of intumescent materials in accordance with the invention employing silicone polymers are shown in Table 7.

The Dow Corning GP-30 has a silicone (organosiloxane) chain backbone with methyl and vinyl groups attached. The material has a specific gravity of 1.08, a durometer of 28 Shore A hardness, a tensile strength of 5.2 MPa, an elongation of 550%, and a tear strength of 10.5 KN/M. The polymer contained a small concentration of silica filler.

The other silicone rubber material, Dow Corning 5331-68-3, is an experimental silicone backbone elastomer with attached methyl, phenyl and vinyl groups. The durometer of the material is about 20 Shore A. The material did rot contain silica filler.

The silicone powder (Dow Corning 4-7081) is a similar elastomer except that it includes grafted methacrylate groups or moieties for bonding to the ethylene polymers. The silicone powder offers the advantage over the silicone rubbers of being suitable as is for mixing with the subject intumescent formulations.

TABLE 7

Intumescent Materials Employing Silicone Elastomers

|  | Preferred Formulation | Silicone Containing Formulations | | | | | |
|---|---|---|---|---|---|---|---|
|  |  | 1 | 2 | 3 | 4 | 5 | 6 |
| Ingredient |  |  |  |  |  |  |  |
| High Density Polyethylene (Paxon 4261A) | 23 | 23 | 23 | 22 | 21 | 18 | 35 |
| Chlorinated Polyethylene (Dow Chemical 3615P) | 30 | 30 | 30 | 29 | 27 | 24 | — |
| Chlorowax (Dover Chemical, Paroil 145) | 7 | — | — | 7 | 6 | 6 | — |
| Ammonium Dihydrogen Phosphate (Monsanto Phoscheck P/30) | 8 | 8 | 8 | 7 | 7 | 6 | 8 |
| Hydrated Magnesium Oxide (Lonza Inc., Magnifin H7) | 2 | 2 | 2 | 2 | 2 | 2 | — |
| Hydrated Aluminum Oxide (Lonza Inc., Martinal OL-104C) | 15 | 15 | 15 | 14 | 14 | 12 | 20 |
| Distearylthiodipropionate (Argus/Witco DSTDP antioxidant) | 0.5 | 0.5 | 0.5 | 0.5 | 0.5 | 0.5 | 1 |
| Hindered Phenol (R.T. Vanderbilt Wingstay L antioxidant) | 0.5 | 0.5 | 0.5 | 0.5 | 0.5 | 0.5 | — |
| Chopped Glass Fiber (3 to 5 mm length) (PPG) | 6 | 6 | 6 | 5 | 5 | 5 | 6 |
| Antimony Oxide (Harwick Chemical Fireshield H) | 3 | 3 | 3 | 3 | 3 | 2 | — |
| Pentaerythritol, Mono & Di (Perstorp) | 5 | 5 | 5 | 5 | 4 | 4 | 10 |
| Silicone Rubber (Dow Corning 5331-68-3) |  | 7 | — |  |  |  |  |
| Silicone Rubber (Dow Corning GP 30) |  | — | 7 |  |  |  |  |
| Silicone Powder (Dow Corning 4-7081) |  |  |  | 5 | 10 | 20 | 20 |
| Properties: |  |  |  |  |  |  |  |
| Torque During Melt Mixing (meter-gram) | 7208 | 4777 | 4555 | 4646 | 4425 | 4090 | 2869 |
| High Temperature During Burning (C) | 336 | 274 | 317 | 269 | 294 | 277 | 279 |
| Degree of Intumescence (thickness expansion %) | 93 | — | — | 72 | 106 | — | 38 |
| Tensile Strength (map) |  |  |  |  |  |  |  |
| Machine Direction | 7.3 | 4.8 | 5.0 |  |  |  |  |
| Cross Machine Direction | 6.4 | 4.6 | 4.9 |  |  |  |  |
| Elongation (%) |  |  |  |  |  |  |  |
| Machine Direction | 653 | 94 | 122 |  |  |  |  |
| Cross Machine Direction | 550 | 44 | 22 |  |  |  |  |

Addition of silicone polymer lowered the torque resistance during melt mixing of the formulation. It also improved the performance of the intumescent material as a thermal barrier, as evidenced by the lower maximum temperature reached during burning.

Other Formulations

Two intumescent material formulations were prepared without glass fiber. The glass was substituted with titanium oxide in one case and with mica in the other case. The formulations did not contain chlorowax either. These formulations also performed well during burning, leading to maximum temperatures (Intumescence Efficiency) and degrees of intumescence of 266° C. and 72% for the titanium oxide, and 270° C. and 67% for the mica-filled composition. Although the center of the sample broke upon removal of the sample from the plate after burning, the rest of the sample was well intumesced and remained very strong.

Another formulation contained the same materials and concentration levels as the preferred formulation except that the high molecular weight polyethylene was substituted with an injection molding grade (Paxon AA55-060). This substitution had the expected effect of lowering the torque during mixing to 5524 meter-gram. During burning, the Intumescence Efficiency was 273° C., and the sample maintained strength after burning.

Foamed Intumescent Formulations

It is desirable to have a foamed lighter weight intumescent material for applications such as sound insulation. Table 8 shows some of the intumescent materials formulations that are made into a foam structure during processing.

TABLE 8

Foamed Intumescent Material Formulations

| Ingredient | Concentration (% by weight) | | | | | |
|---|---|---|---|---|---|---|
|  | 1 | 2 | 3 | 4 | 5 | 6 |
| High Density Polyethylene (Paxon 4261A) | 21 | — | — |  | — |  |
| Chlorinated Polyethylene (Dow Chemical 3615P) | 28 | 43 | 43 | 43 | 43 | 38 |
| Silicone Rubber (Dow Corning 4-7081) | — | — | — | — | — | 5 |
| Chlorowax (Dover Chemical, Paroil 145) | 7 | 8.1 | 8.1 | 8.1 | 8.1 | 8.1 |
| Ammonium Dihydrogen Phosphate (Monsanto Phoscheck P/30) | 7 | 8 | 8 | 8 | 8 | 8 |
| Hydrated Magnesium Oxide (Lonza Inc., Magnifin H7) | 2 | 2 | 2 | 2 | 2 | 2 |
| Hydrated Aluminum Oxide (Lonza Inc., Martinal OL-104C) | 12.5 | 15 | 15 | 15 | 15 | 15 |
| Distrearylthiodipropionate (Argus/Witco DSTDP antioxidant) | 0.7 | 0.5 | 0.5 | 0.5 | 0.5 | 0.5 |
| Hindered Phenol (R.T. Vanderbilt Wingstay L antioxidant) | — | 0.5 | 0.5 | 0.5 | 0.5 | 0.5 |
| Chopped Glass Fiber (3 to 5 mm length) (PPG) | 6 | 6 | — | 6 | — | 6 |
| Antimony Oxide (Harwick Chemical Fireshield H) | 3 | 3 | 3 | 3 | 3 | 3 |
| Pentaerythritol, Mono & Di (Perstorp) | 5 | 5 | 5 | 5 | 5 | 5 |
| Dicumyl Peroxide (Di-Cup 40 KE, Hercules) | 0.05 | 0.05 | 0.05 | 0.05 | 0.05 | 0.05 |
| Trimethylol Propane Trimethacrylate (Saret 500, Sartomer) | 0.05 | 0.05 | 0.05 | 0.05 | 0.05 | 0.05 |
| Azodicarbonamide (Unicell D, Dong Jin) | 7 | 8 | 8 | — | — | — |
| Zinc Stearate (Harwick Chemical) | 0.7 | 0.8 | 0.8 | — | — | — |
| Potassium Bicarbonate (Harwick Chemical) | — | — | — | 8.8 | 8.8 | 8.8 |
| Mica (Suzarite 200PP) | — | — | 6 | — | 6 | — |
| Properties: |  |  |  |  |  |  |
| Intumescence Efficiency | 450 | 263 | 249 | 267 | 260 | 269 |
| Dimensional Change After Burning | 0 | 15 | 54 | 24 | 9 | 19 |

All of the foams did not exhibit any flame break through during burning. The foam based on lightly cross linked elastomers, chlorinated polyethylene with or without silicone provided better thermal barrier than the material containing polyethylene in addition to the elastomer. Good intumescence as indicated by dimensional change was observed for some of the samples. All samples gave a strong structure after the 30 minute burn test using a Bunsen burner with a flame temperature of over 1000° C.

Because of their combination of good physical and intumescent properties, the subject moldings have utility as structural members, sound deadeners, heat barriers and other liner members over a broad range of temperatures.

Where this invention has been described in terms of a preferred embodiment thereof, it will be appreciated that other forms could readily be adapted by one skilled in the art. Accordingly, the scope of this invention is to be considered limited only by the following claims.

We claim:

1. An intumescent thermoplastic molding which is the molded product of a blended mixture initially comprising on the basis of 100 parts by weight blended mixture:
   15 to 25 parts high density polyethylene,
   27 to 33 parts chlorinated polyethylene,
   5 to 10 parts chlorowax,
   7 to 16 parts of at least one of ammonium dihydrogen phosphate and ammonium polyphosphate,
   9 to 17 parts of a least one of hydrated aluminum oxide and hydrated magnesium hydroxide,
   3 to 10 parts of a char former selected from the group consisting of carbohydrates and polyhydric alcohols,
   1 to 3 parts antimony oxide,
   5 to 10 parts of a filler selected from the group consisting of glass fibers and mica particles, and
   an anti-oxidant for said polymeric composition.

2. An intumescent thermoplastic molding which is the molded product of a blended mixture initially comprising on the basis of 100 parts by weight of blended mixture:
   18 to 23 parts high density polyethylene,
   24 to 30 parts chlorinated polyethylene,
   5 to 20 parts silicone rubber,
   5 to 10 parts chlorowax,
   5 to 10 parts of at least one of ammonium dihydrogen phosphate and ammonium phosphate,
   14 to 20 parts of at least one of hydrated aluminum oxide and hydrated magnesium hydroxide,
   4 to 10 parts of a char former selected from the group consisting of carbohydrates and polyhydric alcohols,
   5 to 10 parts of a filler selected from the group consisting of glass fibers and mica particles, and
   an anti-oxidant for said polymeric composition.

3. A moldable mixture for making an intumescent thermoplastic molding, said mixture comprising on basis of a total of 100 parts by weight:
   15 to 25 parts high density polyethylene,
   27 to 33 parts chlorinated polyethylene,
   5 to 10 parts chlorowax,
   7 to 16 parts of a least one of ammonium dihydrogen phosphate and ammonium polyphosphate,
   9 to 17 parts of at least one of hydrated aluminum oxide and hydrated magnesium hydroxide,
   3 to 10 parts of a char former selected from the group consisting of carbohydrates and polyhydric alcohols,
   1 to 3 parts antimony oxide,
   5 to 10 parts of a filler selected from the group consisting of glass fibers and mica particles, and
   an anti-oxidant for said polymeric composition.

4. A moldable mixture for making an intumescent thermoplastic molding, said mixture comprising on the basis of a total of 100 parts by weight:
   18 to 23 parts high density polyethylene,
   24 to 30 parts chlorinated polyethylene,
   5 to 20 parts silicone rubber,
   5 to 10 parts chlorowax,
   5 to 10 parts of gas-generating additives comprising at least one of ammonium dihydrogen phosphate and ammonium phosphate,
   14 to 20 parts of at least one of hydrated aluminum oxide and hydrated magnesium hydroxide,
   4 to 10 parts of a char former selected from the group consisting of carbohydrates and polyhydric alcohols,
   5 to 10 parts of a filler selected from the group consisting of glass fibers and mica particles, and
   an anti-oxidant for said polymeric composition.

5. An intumescent thermoplastic molding as recited in any of claim 1 in which the molding is a foamed molding.

6. A moldable mixture for an intumescent thermoplastic molding as recited in any of claims 3 or 4 in which the molding is a foamed molding.

* * * * *